(12) United States Patent
Furuhashi

(10) Patent No.: US 6,304,375 B1
(45) Date of Patent: Oct. 16, 2001

(54) UPRIGHT MICROSCOPE

(75) Inventor: Hidehiko Furuhashi, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/603,972

(22) Filed: Jun. 26, 2000

(30) Foreign Application Priority Data

Jul. 2, 1999 (JP) .................................................. 11-188660

(51) Int. Cl.[7] .................................................. G02B 21/06
(52) U.S. Cl. ........................... 359/385; 359/390; 359/392
(58) Field of Search ................................... 359/368, 381, 359/385, 388, 390, 391, 392

(56) References Cited

U.S. PATENT DOCUMENTS

| | | | |
|---|---|---|---|
| 1,316,050 | * | 9/1919 | Lidberg .................................. 362/127 |
| 2,329,897 | * | 9/1943 | Heinicke .................................. 359/390 |
| 5,032,011 | * | 7/1991 | Muchel .................................. 359/664 |
| 5,119,233 | * | 6/1992 | Hayashi .................................. 359/390 |

* cited by examiner

Primary Examiner—Cassandra Spyrou
Assistant Examiner—Mark A. Robinson
(74) Attorney, Agent, or Firm—Oliff & Berridge, PLC

(57) ABSTRACT

An upright microscope comprises a microscope main body constituted of a base unit and a stand unit extending upright from the rear end of the base unit. An observation optical system comprising an objective lens and an eyepiece lens is provided at the microscope main body. A stage on which a test piece is placed is assembled into an elevator unit which is caused to move up and down by focusing knobs as an integrated part. The test piece is illuminated by a lamp from below the stage. A recessed portion is formed at the base unit and the lamp is disposed at the recessed portion. The lamp is concealed by a lid member that is attached/detached by sliding over the recessed portion. When the lid member is slid and moved off the base unit, the lamp becomes exposed. As a result, the lamp can be replaced easily.

18 Claims, 11 Drawing Sheets

UPRIGHT MICROSCOPE

INCORPORATION BY REFERENCE

The disclosure of the following priority application is herein incorporated by reference: Japanese Patent Application No. 11-188660 filed Jul. 2,1999

BACKGROUND OF THE INVENTION

1. Field of the Invention

The present invention relates to an upright microscope.

2. Description of the Related Art

FIG. 11 is a side elevation presenting a sectional view of a portion of an upright microscope in the prior art. This upright microscope 101 comprises a base unit 110, a stand unit 120 and a focusing vertical motion mechanism 140. The base unit 110 is formed in an inverted U shape. The bottom of the base unit 110 is closed off by a base plate 110a. A light source lamp 113 is provided inside a space S formed by the base plate 110a. The light source lamp 113 is set on the optical axis of an objective lens 121.

The light source lamp 113 is mounted at a lamp socket 112 supported by a socket retaining plate 111. The socket retaining plate 111 is secured to an access hatch 115 constituting a portion of the base plate 110a with a screw (not shown) or the like. One end of the access hatch 115 is rotatably supported by the base plate 110a via a pin 116, and its other end is secured to the base unit 110 with a screw 117. A condenser lens unit 130 provided at an upper surface 110d of the base unit 110 is set on the optical axis of the objective lens 121.

The stand unit 120 is located at the end of the base unit 110 and is provided with focusing knobs 153 for driving the focusing vertical motion mechanism 140. The focusing vertical motion mechanism 140 is supported by a linear guide mechanism such as a cross roller race, a ball race or a dovetail groove (not shown) along the stand unit 120 in such a manner that it can move vertically, and is provided with a stage 166. The focusing vertical motion mechanism 140 is connected to the focusing knobs 153 via a rack and pinion (not shown) and the stage 166 is caused to move vertically by rotating the focusing knobs 153.

When replacing the light source lamp 113 when it burned out in this upright microscope 101, it is necessary to pull out the lamp socket 112 (the lamp 113) from the space S by (1) laying down the upright microscope 101 rearward or sideways, (2) removing the screw 117 retaining the access hatch 115 and (3) opening the access hatch 115.

Thus, the replacement of the light source lamp 113 is a complicated process and furthermore, there is a risk of striking the stage 166, the focusing knobs 153, a lens barrel 124, the power cord or the like by mistake against the desk when the upright microscope 101 is laid down, causing them damage.

In addition, since the focusing vertical motion mechanism 140, the focusing knobs 153, the condenser lens unit 130, the lamp socket 112 and the like must be mounted at the stand unit 120 and the base unit 110 in a specific order, the assemblability (productivity) is poor.

Moreover, since the focusing vertical motion mechanism 140 and the focusing knobs 153 are provided at the stand unit 120, the focusing knobs 153 are set at a high position distanced from the desk surface further rearward relative to the stage handle (not shown). As a result, it is difficult for the user to operate the focusing knobs 153 and the stage handle while keeping his hands on the desk, and therefore the operability is poor.

SUMMARY OF THE INVENTION

An object of the present invention is to provide an upright microscope that facilitates light source lamp replacement and achieves outstanding productivity and operability.

The upright microscope according to the present invention comprises a microscope main body having a base unit and a stand unit extending upright from the base unit, an observation optical system located at the stand unit including at least an objective lens through which a test piece is observed, a lamp set on the optical axis of the objective lens inside the base unit, which emits light for illuminating the test piece and a lid member detachably provided at an upper portion of the base unit that conceals the lamp inside the base unit.

Simply by detaching the lid member from the upper portion of the base unit, the lamp provided inside the base unit can be exposed. Thus, lamp replacement is facilitated.

The base unit may be constituted as a roughly U-shaped recessed portion with its opening facing upward. By providing the roughly U-shaped recessed portion, the strength of the base unit is improved without having to increase the thickness. It is desirable to set the lamp at the recessed portion of the base unit and to conceal the lamps by covering the recessed portion with the lid member.

A lid member attachment device can be provided at the recessed portion of the base unit. This attachment device may be constituted of a pair of rails, i.e., an upper rail and a lower rail. At least one of them is formed from a material having a spring property. Between the upper and lower rails, a specific gap is created along the direction extending from the front to the rear of the microscope. A slider that is slidably clamped by the pair of rails, the upper and the lower rails, is provided at the lid member.

It is desirable to provide a condenser unit at the lid member to condense light emitted by the lamp. A socket at which the lamp is mounted is provided inside the base unit concealed by the lid member, and it is particularly desirable to provide the socket at the recessed portion.

When the lamp burns out, the socket located inside the base unit can be exposed simply by detaching the lid member provided with the condenser unit.

The upright microscope according to the present invention further comprises an elevator unit that raises and lowers a stage upon which the test piece is placed, with focusing knobs. The elevator unit is provided in the space above the base unit between the lid member and the stand unit in such a manner that it can travel up and down. The elevator unit may be constituted of a stationary portion which is fixed to the stand unit and rotatably supports the focusing knobs axially and an elevator portion that is raised or lowered relative to the stationary portion by the rotation of the focusing knobs. In addition, a bearing that guides the elevator portion while allowing it to move up and down may be provided at the stationary portion.

Since the elevator unit, as well as the lid member, can be constituted as a unit separate from the stand unit and can, therefore, be assembled separately from the microscope main body, assemblability is improved. In addition, by setting the elevator unit closer to the user relative to the stand unit at a lower position, it becomes possible for the user to perform a focusing operation while leaving his hands on the desk, where the microscope is placed, to achieve good operability. It is to be noted that by providing the focusing knobs and the stage knobs at positions symmetrical to each other, a further improvement in operability is achieved.

Another upright microscope according to the present invention comprises a microscope main body having a base unit and a stand unit extending upright from the rear end of the base unit, an observation optical system provided at the stand unit including at least an objective lens through which a test piece is observed, an elevator unit that raises and lowers the stage upon which the test piece is placed with focusing knobs, a lamp that illuminates the test piece from below the stage and a lid member detachably provided at an upper portion of the base unit, which conceals the lamp inside the base unit. The elevator unit is constituted of a stationary portion which is secured to the stand unit and rotatably supports the focusing knobs axially and an elevator portion that is raised and lowered relative to the stationary portion by the rotation of the focusing knobs. A guide surface that guides the elevator portion while allowing it to move up and down may be provided at the stationary portion.

DETAILED DESCRIPTION OF THE PREFERRED EMBODIMENT

The following is an explanation of an embodiment of the upright microscope according to the present invention given in reference to the drawings.

Figure 1:
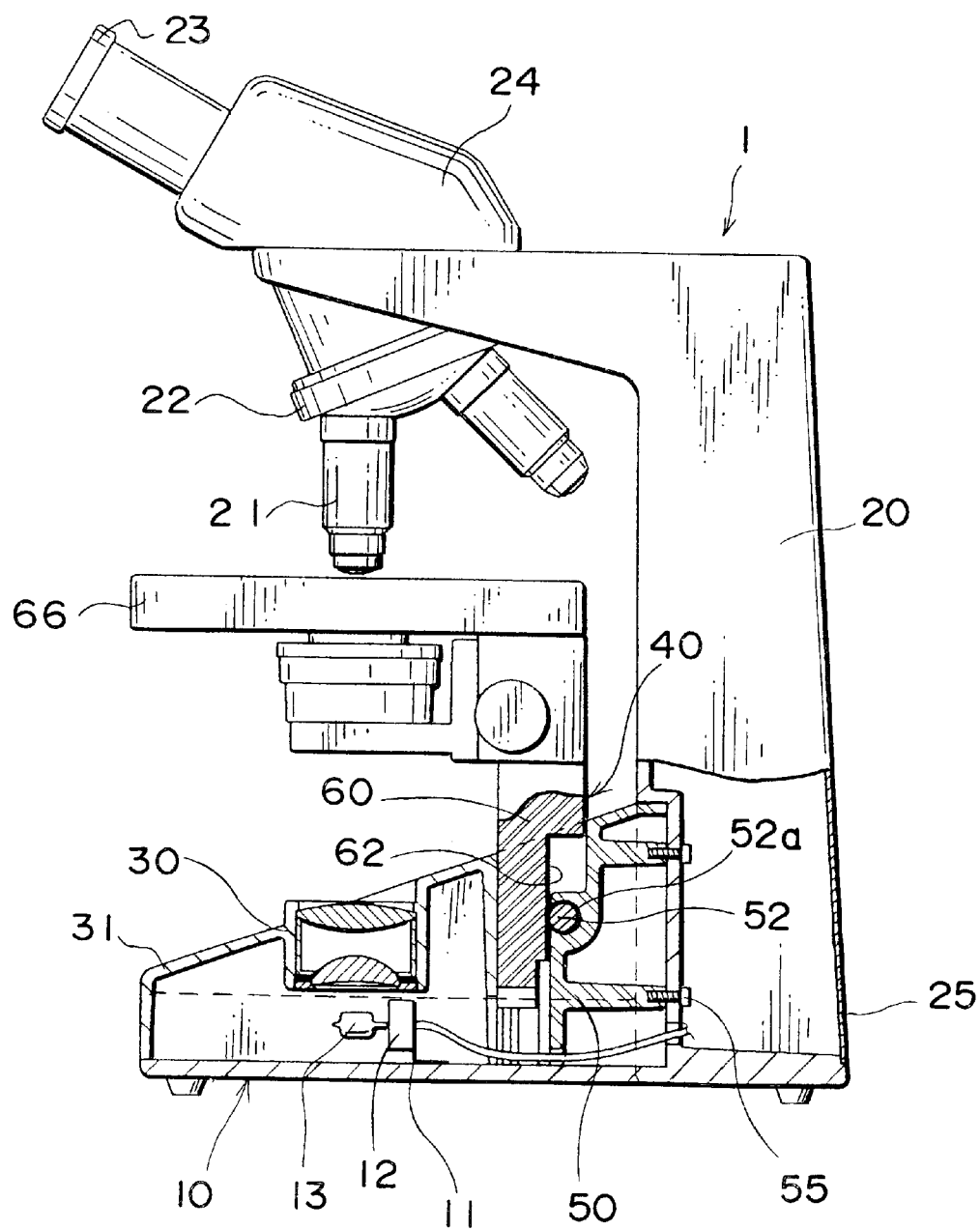
FIG. 1 is a side elevation presenting a sectional view of part of the upright microscope in an embodiment of the present invention with the condenser lens unit mounted.
Figure 2:
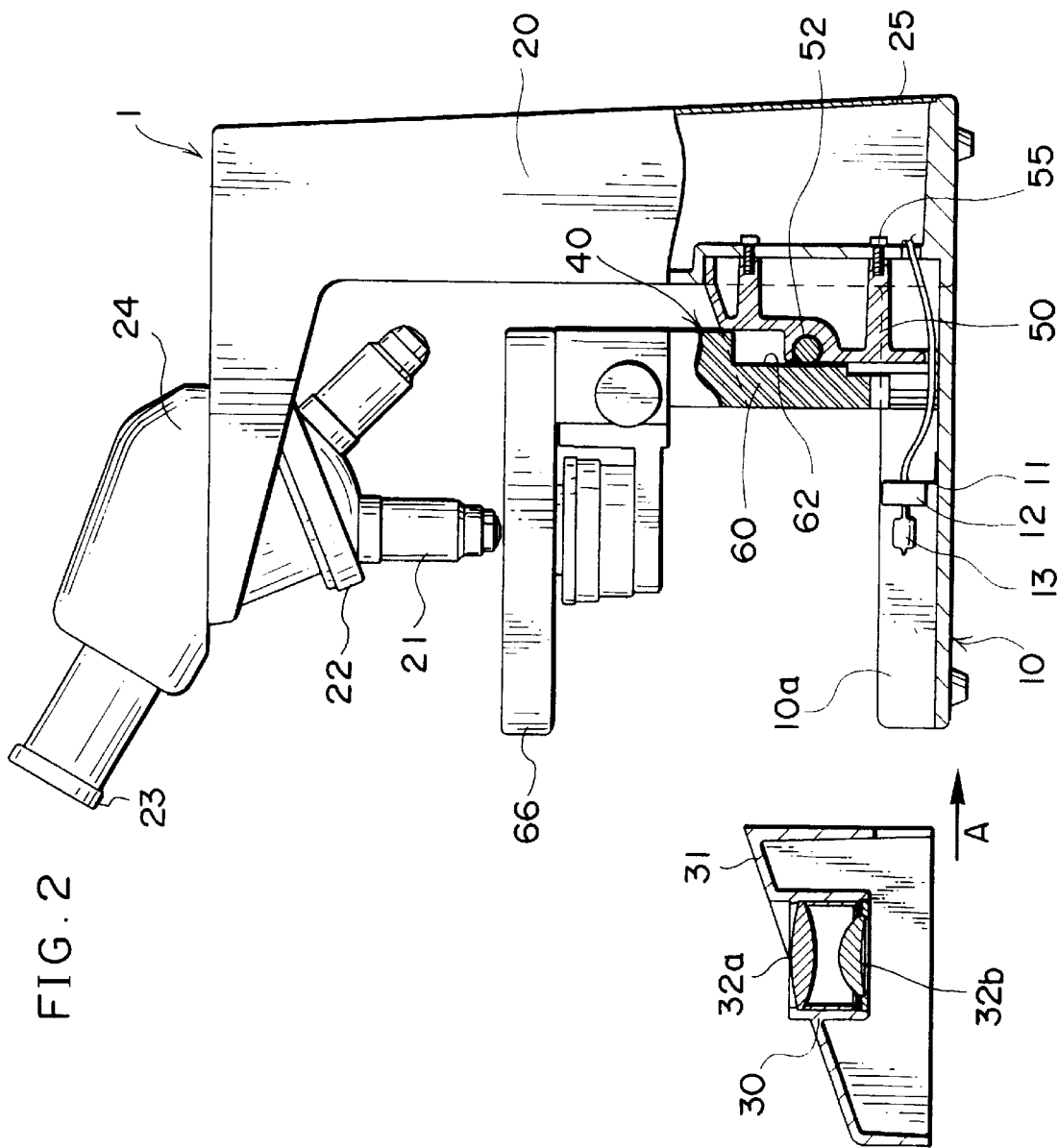
FIG. 2 is a side elevation presenting a sectional view of part of the upright microscope in an embodiment of the present invention with the condenser lens unit detached.
Figure 3:
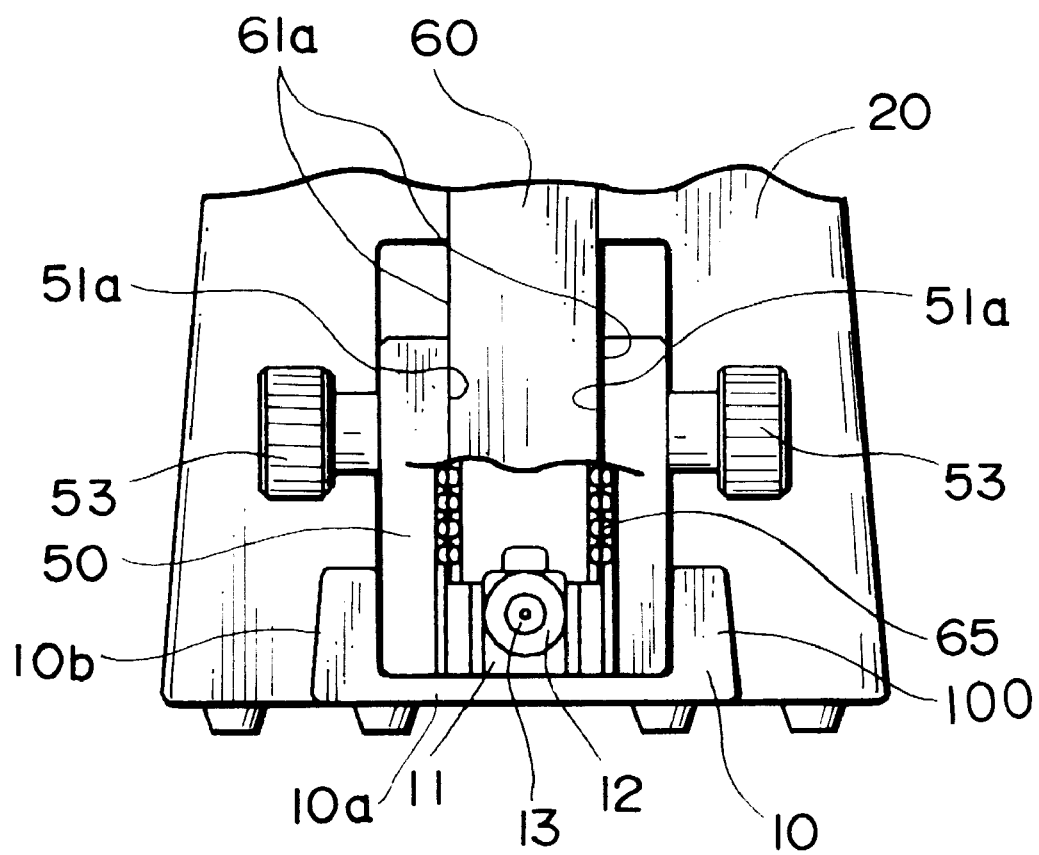
FIG. 3 is a partial enlargement of the upright microscope viewed from the direction A in FIG. 2.
Figure 4:
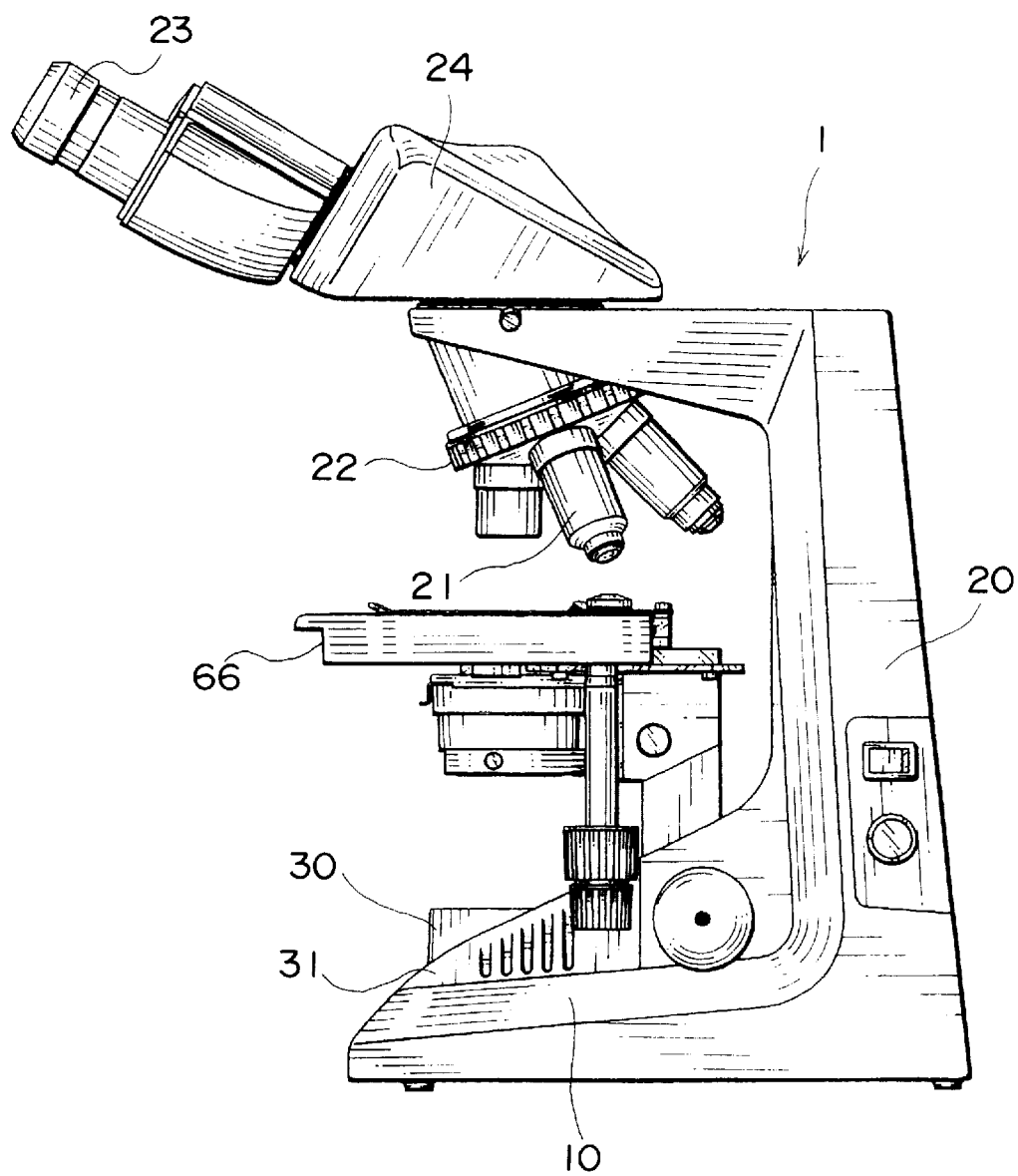
FIG. 4 is a side elevation showing the upright microscope in FIG. 1 in further detail, with the condenser lens unit mounted.
Figure 5:
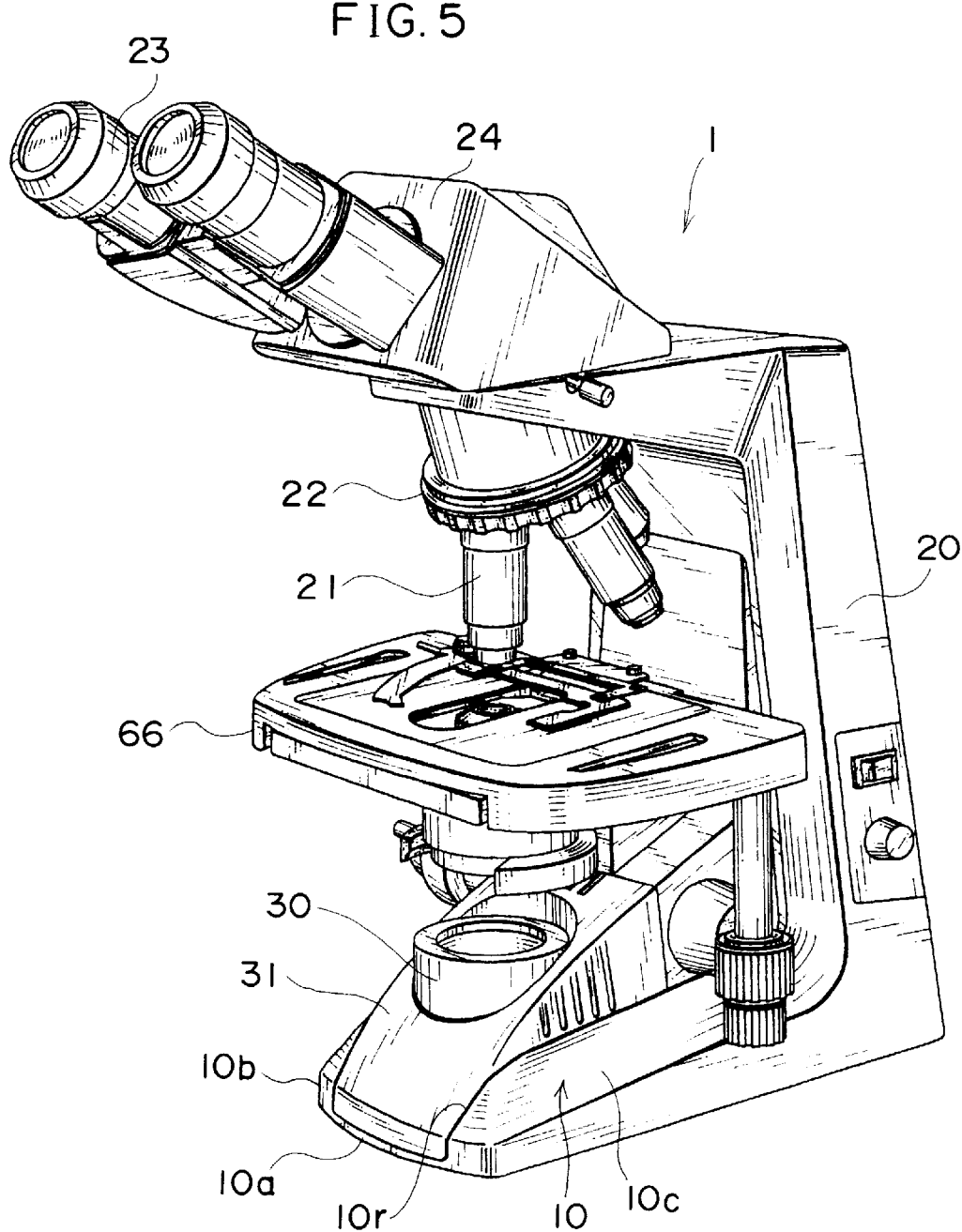
FIG. 5 is a perspective of the upright microscope in FIG. 4.
Figure 6:
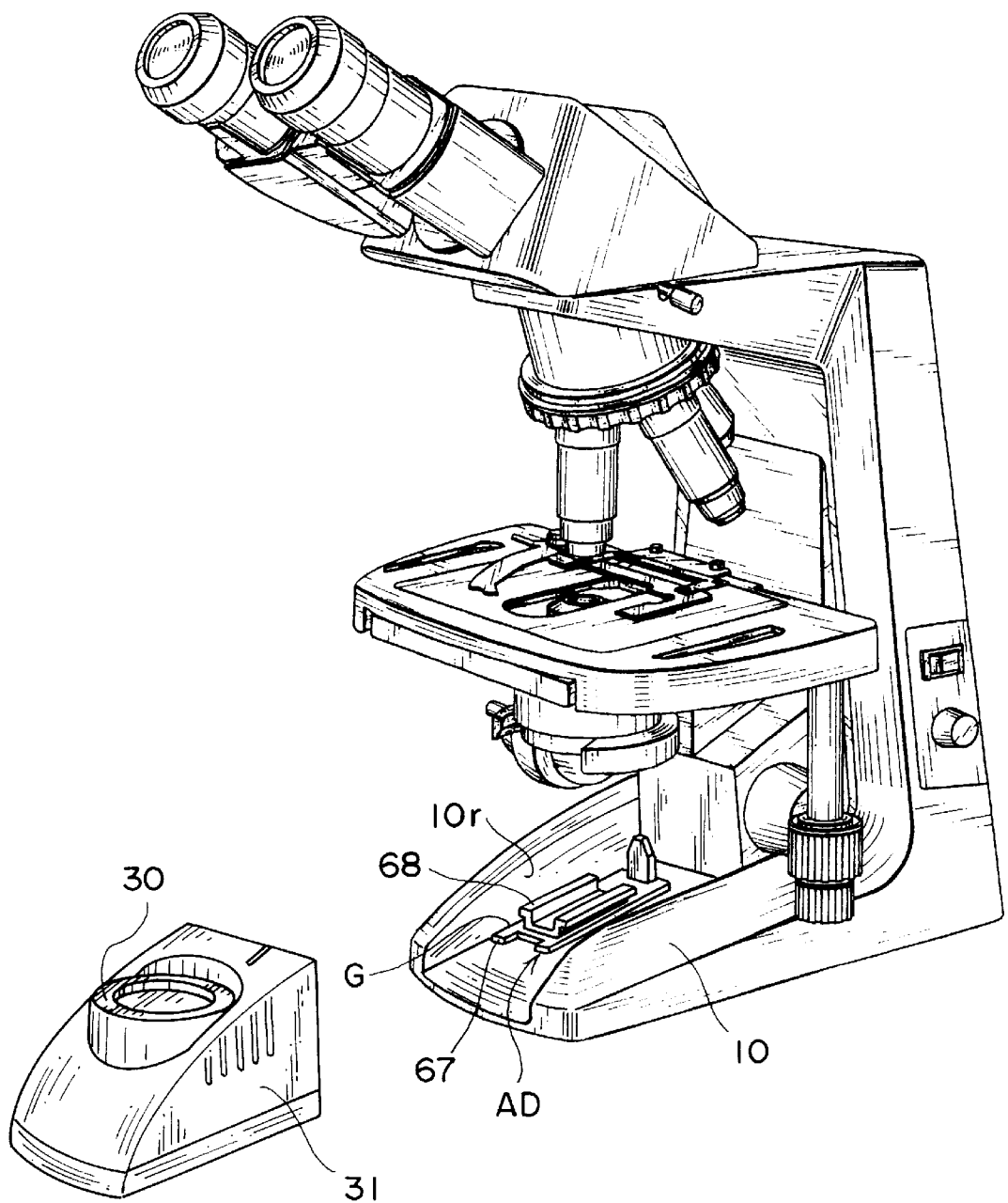
FIG. 6 is a perspective of the upright microscope in FIG. 4, with the condenser lens unit detached.

FIGS. 1 and 2 are side elevations presenting sectional views of part of the upright microscope in an embodiment of the present invention and FIG. 3 is a partial enlargement of the upright microscope viewed from the direction A in FIG. 2. FIG. 4 is a side elevation showing the upright microscope in FIG. 1 in further detail, and FIGS. 5 and 6 are perspectives of the upright microscope in FIG. 4. It is to be noted that FIGS. 1 and 5 illustrate the upright microscope with the condenser lens unit mounted and FIGS. 2 and 6 illustrate the upright microscope with the condenser lens unit detached.

An upright microscope 1 comprises a base unit 10, a stand unit 20, a condenser lens unit 30 and a vertical motion unit 40.

The base unit 10 comprises a bottom plate 10a constituted of a plate and side plates 10b and 10c extending upward from the two end edges of the bottom plate 10a, and a roughly U-shaped recessed portion 10r which opens upward is formed at the base unit 10. A socket retaining plate 11 is mounted at the base plate 10a by screws (not shown) and a socket 12 mounted with a light source lamp 13 is mounted at the socket retaining plate 11. The light source lamp 13 is set on the optical axes of objective lenses 21 and receives power from a power supply (not shown) provided at the stand unit 20. The base unit 10 and the stand unit 20 constitute the microscope main body.

A plurality of objective lenses 21 are mounted at a revolver 22 attached to the stand unit 20 and one of them is selectively set on the optical axis. It is to be noted that a lens barrel 24 having an eyepiece lens 23 is provided over the revolver 22 at the upper end of the stand unit 20. In addition, a lid 25, which faces opposite the vertical motion unit 40 across the stand unit 20 along the direction extending from the front to the rear of the microscope is provided at the lower end of the stand unit 20. The objective lenses 21 and the eyepiece lens 23 constitute the observation optical system.

The condenser lens unit 30 is located at a lid member 31 and is provided with a plurality of lenses 32a and 32b arranged apart from to each other in the vertical direction. The lid member 31 is detachably mounted at the base unit 10 by an attachment device AD illustrated in FIG. 7. When the lid member 31 is mounted at the attachment device AD of the base unit 10 as illustrated in FIG. 1, the optical axes of the lenses 32a and 32b match the optical axis of the objective lens 21.

The vertical motion unit 40 is provided with a focusing vertical motion main unit (stationary portion) 50 and a vertical motion member (elevator portion) 60. The vertical motion unit 40 is located in the space created above the base unit 10 between the lid member 31 and the stand unit 20. The focusing vertical motion main unit 50, which is preassembled as focusing knobs unit to be detailed later, is secured to the stand unit 20 by a plurality of bolts 55. The bolts 55 are tightened from the rear of the microscope 1 after the lid 25 at the stand unit 20 is opened. A female race (guide surface) 51a such as a cross roller guide extending along the vertical direction is formed at the focusing vertical motion main unit 50, and a male race 61a, which can slide against the female race 51a is formed at the vertical motion member 60. A plurality of rollers 65 are provided between a groove formed at the vertical motion member 60 and extending along the vertical direction and a groove formed at the focusing vertical motion main unit 50 and extending along the vertical direction.

The vertical motion member 60 supports a stage 66 upon which a specimen (test piece) is placed. A rack 62 is formed on the side of the vertical motion member 60 toward the stand unit 20. The rack 62 meshes with a pinion 52a provided at a rotating shaft 52 which, in turn, is rotatably provided at the focusing vertical motion main unit 50.

Focusing knobs 53 are provided as an integrated part of the rotating shaft 52, and the pinion 52a is caused to rotate in response to rotation of the focusing knobs 53. The focusing vertical motion main unit 50, the rotating shaft 52 and the focusing knobs 53 constitute focusing knobs unit. Namely, by attaching the rotating shaft 52 to the focusing vertical motion main unit 50 and mounting the focusing knobs 53 at the rotating shaft 52, the focusing knob unit is prepared as an assembled body. As illustrated in FIG. 2, this focusing knob unit is placed in contact with the front wall of the stand unit 20 and is secured to the stand unit 20 with the screws 55 from the rear of the stand unit 20.

In the vertical motion unit 40, structured as described above, by rotating the focusing knobs 53, the vertical motion member 60 is caused to move linearly in the vertical direction along the focusing vertical motion main unit 50. As a result, the stage 66 is raised or lowered.

Figure 7:
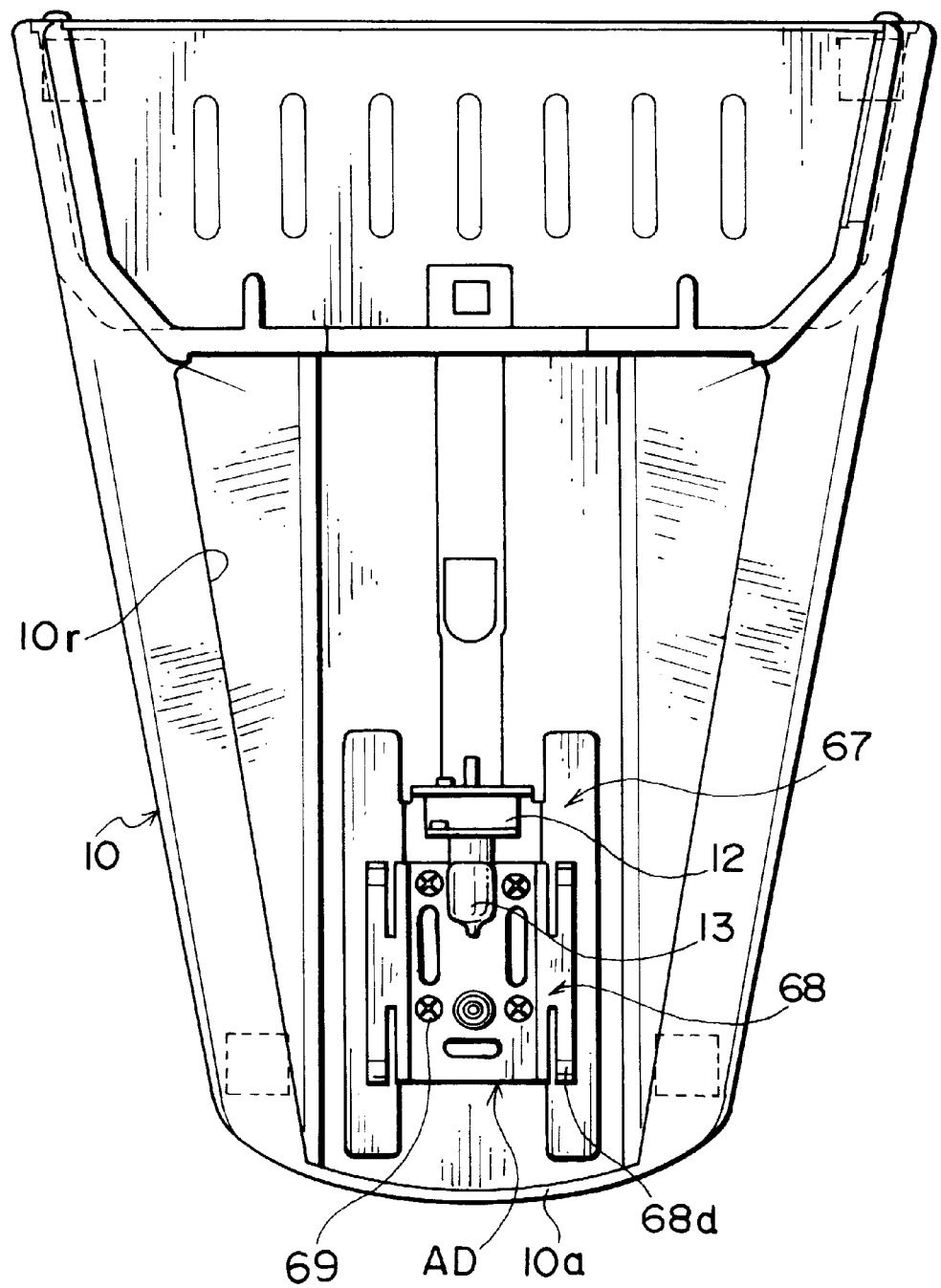
FIG. 7 is a plan view of the recessed portion at the base unit where the upper and lower rails are provided.

In reference to FIGS. 4~10, the structure of the attachment device AD used to attach the lid member 31 is explained in detail. FIG. 6 is a perspective showing the attachment device AD with the lid member 31 detached from the base unit 10. FIG. 7 is a plan view of the attachment device AD mounted at the base unit 10. The attachment device AD comprising an H-shaped base board 67 illustrated in FIGS. 8A~8C and a plate spring 68 illustrated in FIGS. 9A~9C is mounted at the base unit 10 with screws 69.

Figure 8A:
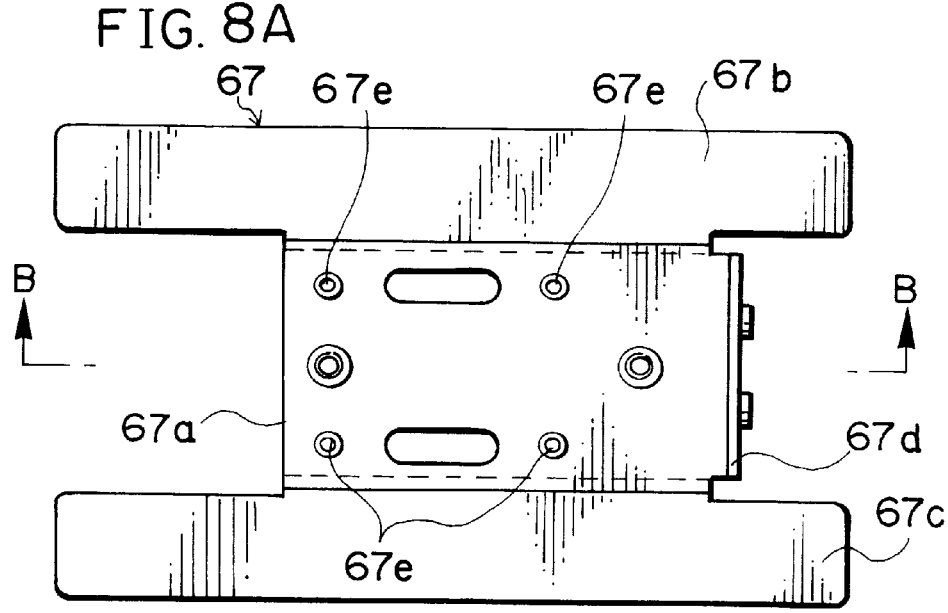
FIG. 8A is a plan view of the base board at which the lower rails are provided.
Figure 8B:
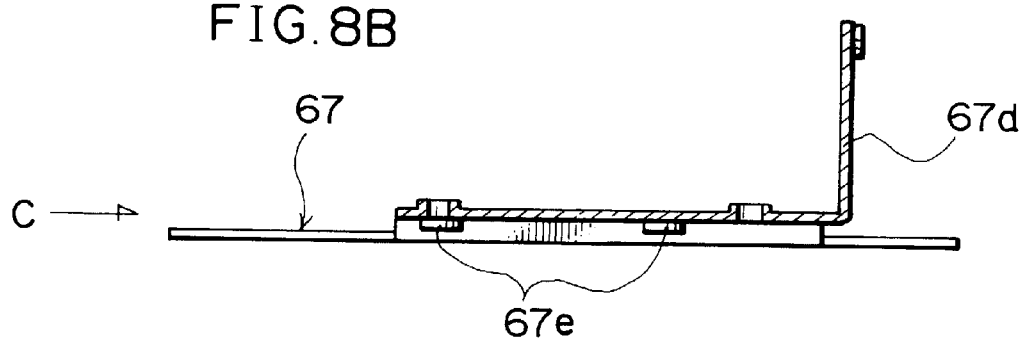
FIG. 8B is a lateral cross section of the base board, obtained by viewing FIG. 8A from the direction B.
Figure 8C:
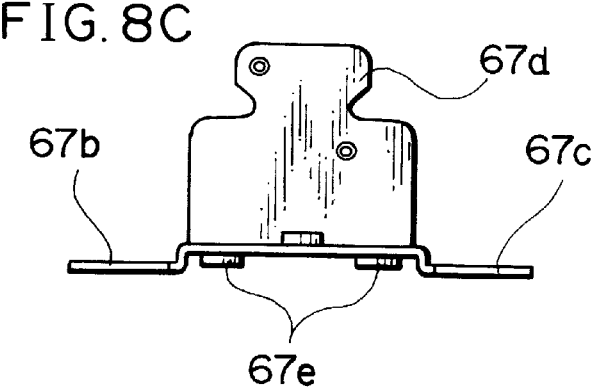
FIG. 8C is a front cross section of the base board, obtained by viewing FIG. 8A from the direction C.

FIG. 8A is a plan view of the base board 67, FIG. 8B is a lateral cross section of the base board 67 obtained by viewing FIG. 8A from the direction B and FIG. 8C is a front view of the base board 67 obtained by viewing FIG. 8A from the direction C. As illustrated in FIGS. 8A~8C, the base board 67 includes a central base 67a, a pair of lower rails 67b and 67c provided to the left and right of the base 67a and a socket mounting plate 67d rising vertically at the rear end of the base 67a. The socket 12 is mounted at the socket mounting plate 67d. Reference number 67e indicates a hole provided to mount the base board 67 at the base plate 10a of the base unit 10.

Figure 9A:
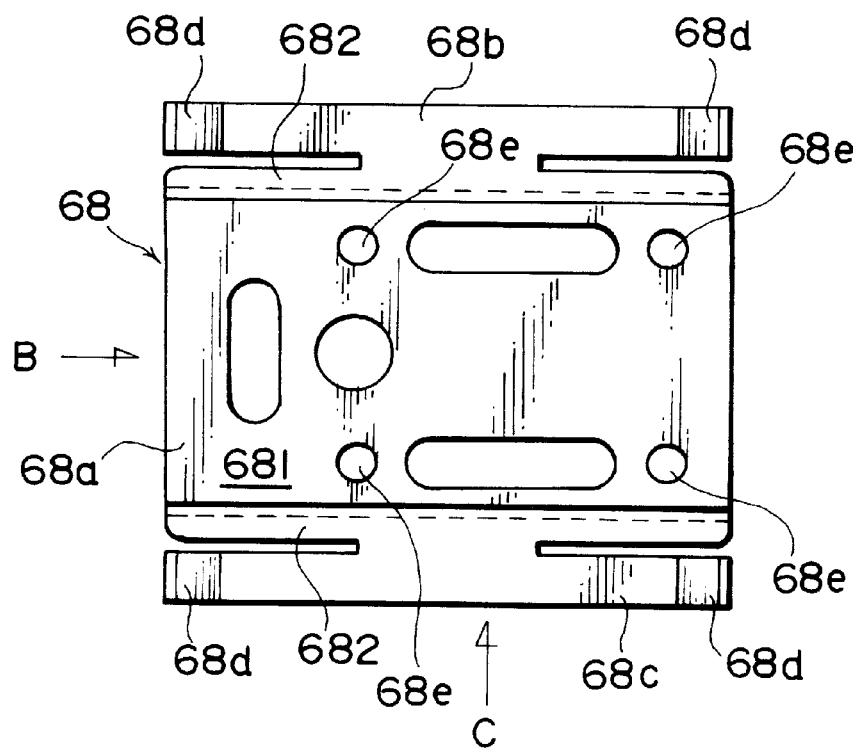
FIG. 9A is a plan a view of the plate spring at which the upper rails are provided.
Figure 9B:
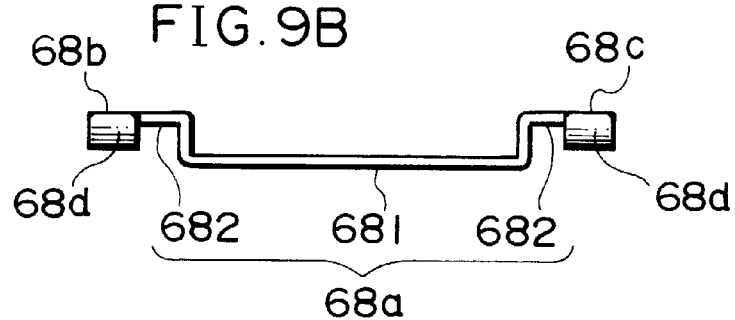
FIG. 9B is a front view of the plate spring, obtained by viewing FIG. 9A from the direction B.
Figure 9C:
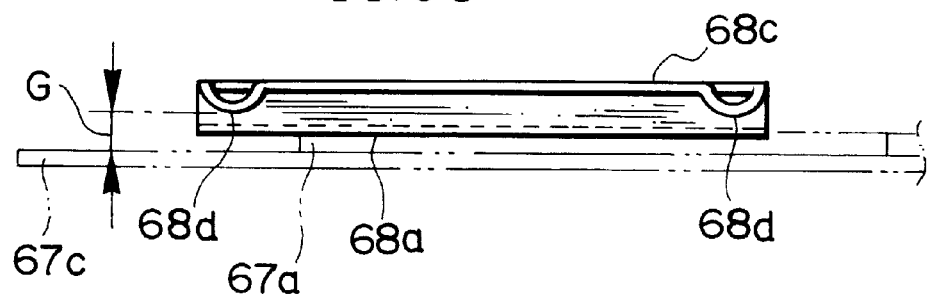
FIG. 9C is a side elevation of the plate spring, obtained by viewieng FIG. 9A from the direction C.

FIG. 9A is a plan view of the plate spring 68, FIG. 9B is a front view of the plate spring 68 obtained by viewing FIG. 9A from the direction B and FIG. 9C is a side elevation of the plate spring 68 obtained by viewing FIG. 9A from the direction C. As illustrated in FIGS. 9A~9C, the plate spring 68 constituted of spring material has a central base 68a. The base 68a is constituted of a bottom plate 681 and a pair of arms 682 rising from the two ends of the bottom plate 681 at the left and the right in an L-shape. Upper rails 68b and 68c are provided, each continuously to one of the pair of arms 682. A holding member 68d projecting downward is formed at four locations, i.e., the front ends and the rear ends of the pair of upper rails 68b and 68c. As shown in FIG. 9C, the holding members 68d is formed to be a semicircular in cross section. Mounting holes 68e are formed at the plate spring 68, at positions corresponding to those of the mounting holes 67e at the base board 67.

Figure 10:
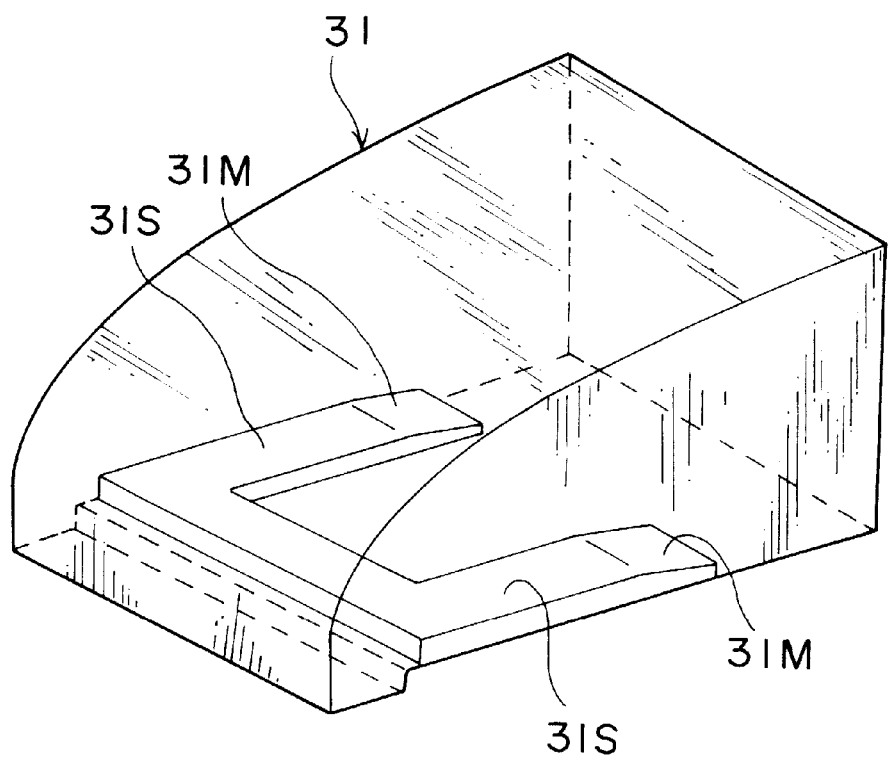
FIG. 10 is a perspective of the lid member.
Figure 11:
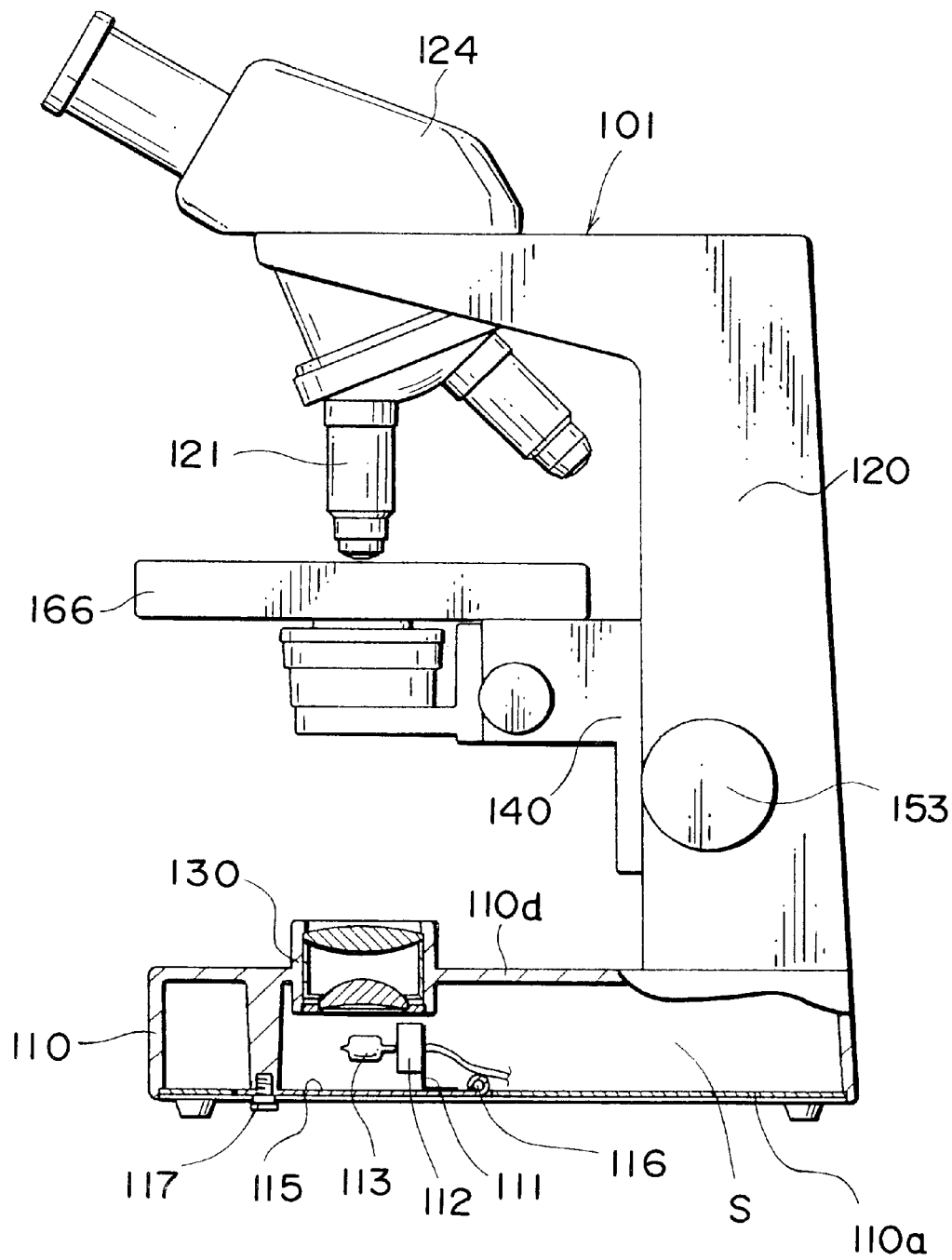
FIG. 11 is a side elevation, presenting a sectional view of part of an upright microscope in the prior art.

The base board 67 and the plate spring 68 are sequentially placed over the upper surface of the base unit 10. During this process, the mounting holes 68e are aligned with the mounting holes 67e, and the base board 67 and the plate spring 68 are jointly screwed to the base unit 10 with the screws 69. At this time, a specific gap G is created between the upper surfaces of the lower rails 67b and 67c and the lower surfaces of the holding members 68d at the upper rails 68b and 68c of the plate spring 68, as illustrated in FIGS. 6 and 9C. As illustrated in FIG. 10, a slider 31S having a planar U-shape and having inclined surfaces 31M formed at its front ends is provided at the bottom of the lid member 31, and the slider 31S is clamped by the upper and lower rails 67b, 67c, 68b and 68c and slides inside the gap G.

In the upright microscope in this embodiment, the lid member 31 is mounted at the base unit 10 by inserting the slider 31S of the lid member 31 into the gap G formed by the upper and lower rails 67b, 67c, 68b and 68c at the base unit 10 from the front of the microscope 1 and allowing the slider 31S to slide to the rear of the microscope. The slider 31S of the lid member 31 is clamped between the upper rails 68b and 68c and the lower rails 67b and 67c by the upper rails 68b and 68c achieving a spring property, so that the lid member 31 is secured to the base unit 10. The lid member 31 can be slid and detached easily out of the base 10. As a result, since the lamp 13 mounted at the socket 12 can be exposed simply by detaching the lid member 31 from the base unit 10 when the light source lamp 13 has burned out, the lamp 13 can be replaced with ease.

Since the microscope does not need to be laid down as is required in the prior art and can be left erect at this time, there is no risk of striking the stage 66, the focusing knobs 53, the lens barrel 24, the power cord (not shown) and the like against the desk to damage them.

In addition, since the condenser lens unit 30, the vertical motion unit 40, and the focusing knob unit are formed as separate units from the stand unit 20, the individual units can be assembled independently of the microscope main unit constituted of the stand unit 20 and the base unit 10. The vertical motion unit 40 can be secured to the stand unit 20 from the rear of the microscope without having to lay the microscope down. Thus, the individual units can be mounted at the microscope main unit efficiently to achieve an improvement in productivity.

Furthermore, since the focusing knobs 53 are provided at the vertical motion unit 40 instead of at the stand unit 20, the focusing knobs can be set at a low position in the middle of the microscope at an equal distance from the user on the left and on the right side. As a result, outstanding operability, which allows the user to operate the focusing knobs 53 and the stage handle (not shown) with his hand left on the desk and without having to twist his body, is achieved.

It is to be noted that since the focusing knobs 53 are provided near the stage handle, the focusing knobs 53 and the stage handle can be operated together with one hand. In addition, since the base unit 10 is formed in a U shape, its strength is increased so that the thickness of the base plate 10a can be reduced.

According to the present invention, the lamp provided inside the base unit can be accessed simply by detaching the lid member in the upper portion of the base unit, without having to use any means of tightening such as screws or any special tools. Thus, the present invention is not limited to the embodiment explained above, and can be adopted in any structure having a lamp concealed by a lid member that can be detached/attached easily

What is claimed is:

1. An upright microscope, comprising:
   a microscope main body having a base unit and a stand unit extending upright from said base unit;
   an observation optical system located at said stand unit including at least an objective lens through which a test piece is observed;
   a lamp set on the optical axis of said objective lens inside said base unit, which emits light for illuminating the test piece;
   a lid member detachably provided at an upper portion of said base unit that conceals said lamp inside said base unit; and
   a recessed portion formed at said base unit to open upward, wherein;

said lamp is housed in said recessed portion and said recessed portion is covered by said lid member.

2. An upright microscope according to claim 1, wherein; said recessed portion has a rougbly U-shaped section.

3. An upright microscope according to claim 2, wherein;
a lid member attachment device is provided at said recessed portion of said base unit;
said lid member attachment device comprises a pair of an upper rail and a lower rail between which a specific gap is formed along a direction extending from front to rear of said microscope, at least either said upper rail or said lower rail having a spring property; and
said lid member is provided with a slider that is slidably clamped by said pair of said upper and lower rails, and slides inside said gap.

4. An upright microscope according to claim 2, wherein;
a condenser unit is provided at said lid member to condense light emitted by said lamp.

5. An upright microscope according to claim 2, wherein;
a socket at which said lamp is mounted is provided inside said base unit concealed by said lid member.

6. An upright microscope according to claim 2, further comprising;
an elevator unit that raises and lowers a stage on which the test piece is placed with focusing knobs, said elevator unit being elevatably provided in a space above said base unit between said lid member and said stand.

7. An upright microscope according to claim 2, wherein;
said elevator unit comprises a stationary portion which is fixed to said stand unit and rotatably supports said focusing knobs axially and an elevator portion that is raised and lowered along a guide surface of said stationary portion by the rotation of said focusing knobs.

8. An upright microscope according to claim 1, wherein;
a condenser unit is provided at said lid member to condense light emitted by said lamp.

9. An upright microscope according to claim 1, wherein;
a socket at which said lamp is mounted is provided inside said base unit concealed by said lid member.

10. An upright microscope according to claim 1, wherein;
a socket at which said lamp is mounted is provided at said recessed portion of said base unit.

11. An upright microscope according to claim 1, further comprising;
an elevator unit that raises and lowers a stage on which the test piece is placed with focusing knobs, said elevator unit being elevatably provided in a space above said base unit between said lid member and said stand.

12. An upright microscope according to claim 11, wherein:
said elevator unit comprises a stationary portion which is fixed to said stand unit and rotatably supports said focusing knobs axially and an elevator portion that is raised and lowered along a guide surface of said stationary portion by the rotation of said focusing knobs.

13. An upright microscope comprising:
a microscope main body having a base unit and a stand unit extending upright from a rear end of said base unit;
an observation optical system provided at said stand unit including at least an objective lens through which a test piece is observed;
an elevator unit that raises and lowers a stage upon which the test piece is placed with focusing knobs;
a lamp that illuminates the test piece from below said stage; and
a lid member detachably provided at an upper portion of said base unit, which conceals said lamp inside said base unit, wherein:
said elevator unit includes a stationary portion which is secured to said stand unit and rotatably supports said focusing knobs axially and an elevator portion that is raised and lowered along a guide surface of said stationary portion by the rotation of said focusing knobs;
a recessed portion is formed at said base unit to open upward,
said lamp is housed in said recessed portion, and
said recessed portion is covered by said lid member.

14. An upright microscope according to claim 13, wherein;
said recessed portion has a roughly U-shaped section.

15. An upright microscope according to claim 14, wherein;
a lid member attachment device is provided at said recessed portion of said base unit;
said lid member attachment device comprises a pair of an upper rail and a lower rail between which a specific gap is formed along a direction extending from front to rear of said microscope, at least either said upper rail or said lower rail having a spring property; and
said lid member is provided with a slider that is slidably clamped by said pair of said upper and lower rails, and slides inside said gap.

16. An upright microscope according to claim 15, wherein;
a condenser unit is provided at said lid member to condense light emitted by said lamp.

17. An upright microscope according to claim 13, wherein;
a socket at which said lamp is mounted is provided inside said base unit concealed by said lid member.

18. An upright microscope according to claim 13, wherein;
a socket at which said lamp is mounted is provided at said recessed portion of said base unit.

* * * * *